United States Patent
Philibert et al.

(10) Patent No.: US 10,955,902 B2
(45) Date of Patent: Mar. 23, 2021

(54) OPTIMIZED MANAGEMENT OF THE POWER SUPPLY OF A MICROCONTROLLER

(71) Applicant: INGENICO GROUP, Paris (FR)

(72) Inventors: Eric Philibert, Saint-Marcellin (FR); Slimane Ay, Bourg de Peage (FR)

(73) Assignee: INGENICO GROUP, Paris (FR)

( * ) Notice: Subject to any disclaimer, the term of this patent is extended or adjusted under 35 U.S.C. 154(b) by 63 days.

(21) Appl. No.: 16/308,237

(22) PCT Filed: Jun. 9, 2017

(86) PCT No.: PCT/EP2017/064090
§ 371 (c)(1),
(2) Date: Dec. 7, 2018

(87) PCT Pub. No.: WO2017/212020
PCT Pub. Date: Dec. 14, 2017

(65) Prior Publication Data
US 2019/0265775 A1    Aug. 29, 2019

(30) Foreign Application Priority Data
Jun. 9, 2016    (FR) ..................... 16 55300

(51) Int. Cl.
*G06F 1/32* (2019.01)
*G06F 1/3234* (2019.01)
(Continued)

(52) U.S. Cl.
CPC .......... *G06F 1/3243* (2013.01); *G06F 1/3206* (2013.01); *G06Q 20/20* (2013.01);
(Continued)

(58) Field of Classification Search
CPC ..................................... G06F 1/32; G06F 9/44
See application file for complete search history.

(56) References Cited

U.S. PATENT DOCUMENTS

2005/0168379 A1* 8/2005 Griessbaum ............ G01S 13/10
    342/124
2007/0090815 A1* 4/2007 Hsieh ....................... G05F 1/56
    323/269

(Continued)

OTHER PUBLICATIONS

International Search Report dated Dec. 6, 2018 for corresponding International Application No. PCT/EP2017/064090, filed Jun. 9, 2017.
(Continued)

*Primary Examiner* — Keshab R Pandey
(74) *Attorney, Agent, or Firm* — David D. Brush; Westman, Champlin & Koehler, P.A.

(57) ABSTRACT

A printed circuit including a microcontroller having at least one main element, termed a core, and at least one peripheral unit. The printed circuit has a selective power supply management for managing the power supply of the microcontroller. The selective management receives a command to shutdown the microcontroller coming from an internal shutdown function of the microcontroller, and reversibly cuts the power supply to the at least one peripheral unit while maintaining the power supply to the core.

5 Claims, 1 Drawing Sheet

(51) Int. Cl.
  *G06F 1/3206* (2019.01)
  *G07G 1/00* (2006.01)
  *G06Q 20/20* (2012.01)
  *G07G 1/12* (2006.01)
(52) U.S. Cl.
  CPC ............ *G07G 1/0018* (2013.01); *G07G 1/12* (2013.01); *Y02D 10/00* (2018.01)

(56) References Cited

U.S. PATENT DOCUMENTS

| | | |
|---|---|---|
| 2008/0074171 A1 | 3/2008 | Bhattacharya et al. |
| 2008/0155280 A1 | 6/2008 | Hacking et al. |
| 2010/0122098 A1* | 5/2010 | Kay ................ G06F 1/3209 713/310 |
| 2010/0156457 A1* | 6/2010 | Greene ............ H03K 19/17784 326/39 |
| 2011/0022482 A1* | 1/2011 | Florek ................ G06Q 20/32 705/16 |
| 2015/0178008 A1 | 6/2015 | Hoayun |
| 2016/0004292 A1 | 1/2016 | Sharda et al. |

OTHER PUBLICATIONS

Written Opinion of the International Searching Authority dated Dec. 6, 2018 for corresponding International Application No. PCT/EP2017/064090, filed Jun. 9, 2017.

English translation of the International Written Opinion dated Sep. 28, 2017 for corresponding International Application No. PCT/EP2017/064090, filed Jun. 9, 2017.

* cited by examiner

OPTIMIZED MANAGEMENT OF THE POWER SUPPLY OF A MICROCONTROLLER

CROSS-REFERENCE TO RELATED APPLICATIONS

This Application is a Section 371 National Stage Application of International Application No. PCT/EP2017/064090, filed Jun. 9, 2017, which is incorporated by reference in its entirety and published as WO 2017/212020 on Dec. 14, 2017, not in English.

1. FIELD OF THE DISCLOSURE

The disclosure relates to the field of electronic devices that can offer "autonomous" or "self-powered" applications. The invention relates more specifically to the optimizing of the energy consumption of such devices, especially in "standby" or "sleep" mode or "energy savings" mode.

2. PRIOR ART

Certain electronic devices (such as the commonly used smartphones, tablets or electronic payment terminals) require the implementing of a powerful and high-performance microcontroller in order to be able to offer all the required applications in an optimal way.

To this end, there are, on the whole, two classes of microcontrollers:
- a first type: microcontrollers that consume very little energy in "standby" mode but are highly energy intensive during operation;
- a second type: microcontrollers that are highly energy intensive in "standby" mode but consume little energy during operation.

The choice of a microcontroller of the second type is preferred, especially to meet the fairly strict requirements in terms of energy consumption for autonomous applications. However, with this second type of microcontroller, the requirements of low energy consumption are met during operation but not in "standby" mode.

Thus, to overcome this drawback of excessively high energy consumption in "standby" mode, it is common practice not to use the "standby" mode of the microcontroller but to shut down the microcontroller in order to reduce its energy consumption. This solution of use however has another drawback related to the restarting/reaction time of the microcontroller when it is woken up or powered on. Indeed, this wake-up time is often excessively long and leads to a deterioration especially of the user's experience.

Thus, for example, in the field of electronic payment terminals, an excessively long restarting/wake-up time can not only greatly impair the user's experience during a transaction but also greatly slow down the general operation, for example in a business such as a restaurant at peak working hours.

There is therefore a need for a technique enabling the use of microcontrollers that have optimal/minimum energy consumption when working in "standby" mode while having an optimal reaction time when coming out of "standby" mode.

3. SUMMARY OF THE INVENTION

The proposed technique relates to a printed circuit comprising a microcontroller comprising at least one main element, called a core, and at least one peripheral unit, as well as selective means for managing the power supply of the microcontroller implementing the following means:
- means for receiving a command for shutting down the microcontroller, the command coming from an internal shut-down function of the microcontroller;
- means for the reversible cutting off of the power supply of said at least one peripheral unit;
- means for maintaining the power supply of said core.

Thus, the invention proposes a novel and inventive solution to the management of the consumption of a microcontroller in implementing a selective cutting off of the power supply to certain peripheral units of the microcontroller while at the same time preserving the power supply of the core of the microcontroller and that of certain peripheral units during a command for shutting down this microcontroller.

In this way, the shutting down of the microcontroller corresponds to a placing of the device in "partial" standby, here below called "optimal standby", effectively enabling a sharp reduction in the energy consumption of this device while enabling it to restart or to come out of standby rapidly through the fact that the power supply to the core and other peripheral units of the microcontroller is not cut off.

Indeed, the principle of the invention according to its different embodiments consists of the selective cutting off of the power supply to the different units of the microcontroller instead of cutting off the power supply to all of them, as in a "classic" operation for shutting down the microcontroller, or not cutting off the power to them as in the case of a "classic" operation for putting the microcontroller on standby.

Thus, the advantages of shutting down the microcontroller, related to the drop in its energy consumption, are obtained without the drawbacks related to the wake-up time.

According to one particular aspect of the invention, the selective means for managing the power supply correspond to a controlled switch electronically connected, on the one hand, to a shut-down function internal to the microcontroller capable of processing the shut-down command and, on the other hand, to at least one input for commanding the power supply of the peripheral unit.

Thus, according to this embodiment, the selective cutting-off of the power supply to the different units of the microcontroller is implemented through a controlled switch connected, on the one hand, to the internal cut-off function of the microcontroller so as to be triggered by a cut-off command and, on the other hand, to one or more inputs for commanding the power supply to the peripheral unit or units of the microcontroller.

In this way, only the peripheral units for which the power supply commands are connected to the controlled switch are shut down by a shut-down command of the microcontroller. The other non-connected peripheral units as well as the core of the microcontroller will remain powered.

For example, the peripheral unit corresponds to a unit of the microcontroller that is not necessary for waking up the microcontroller and/or not necessary for saving or memorizing the state of the microcontroller.

Thus, according to this embodiment, the goal of the invention is attained by selecting the peripheral units to be placed or not placed on standby depending on whether or not they are indispensable to the waking up of the microcontroller and/or to the saving of the state of the microcontroller so as to obtain an almost instantaneous wake-up of the microcontroller.

Indeed, if only the units necessary for the "bare minimum" requirements of the microcontroller, i.e. the units used for waking up the microcontroller and/or saving its state remain powered when the microcontroller is put on standby, the waking up of this microcontroller, upon reception of a wake-up command, will be almost instantaneous and will require only that the wake-up command be taken into account.

The other units, the power supply of which will have been selectively cut off, could be repowered as and when the microcontroller is used.

The invention also relates to an electronic payment terminal comprising a printed circuit as described here above.

4. FIGURES

Other characteristics and advantages shall appear more clearly from the following description of a particular embodiment of the disclosure, given by way of a simple, illustrative and non-exhaustive example and from the appended drawings, of which:

5. DESCRIPTION

The general principle of the technique described consists in diverting or redirecting an internal function of a microcontroller intended for shutting down the microcontroller, placing it in "optimal standby" mode and optimizing its energy consumption.

To this end, the internal function for turning off the microcontroller is diverted, by hardware means, to selectively cut off certain power supplies for certain elements, also called peripheral units or cells of the microcontroller. Thus, only the power supplies of the microcontroller that are not necessary for waking up this microcontroller and/or not necessary for saving its state during a standby or when it comes out of standby are cut off while the other units, including the core of the microcontroller, remain powered.

Thus, the energy consumption is optimized because all the "non-vital" units are no longer powered and therefore consume no further energy when the microcontroller is put into "optimal standby". In addition, the fact of preserving the power supply of the units managing the "bare minimum" requirements of the microcontroller enable an almost instantaneous wake-up or exit from "optimal standby" mode on the part of the microcontroller.

The solution of the invention according to its different embodiments therefore meets the twofold requirement of low consumption in "optimal standby" mode and optimal wake-up time, without modification of either the microcontroller managing software or its internal programming but only through a few hardware modifications made in the printed circuit on which the microcontroller is implanted.

Figure 1:
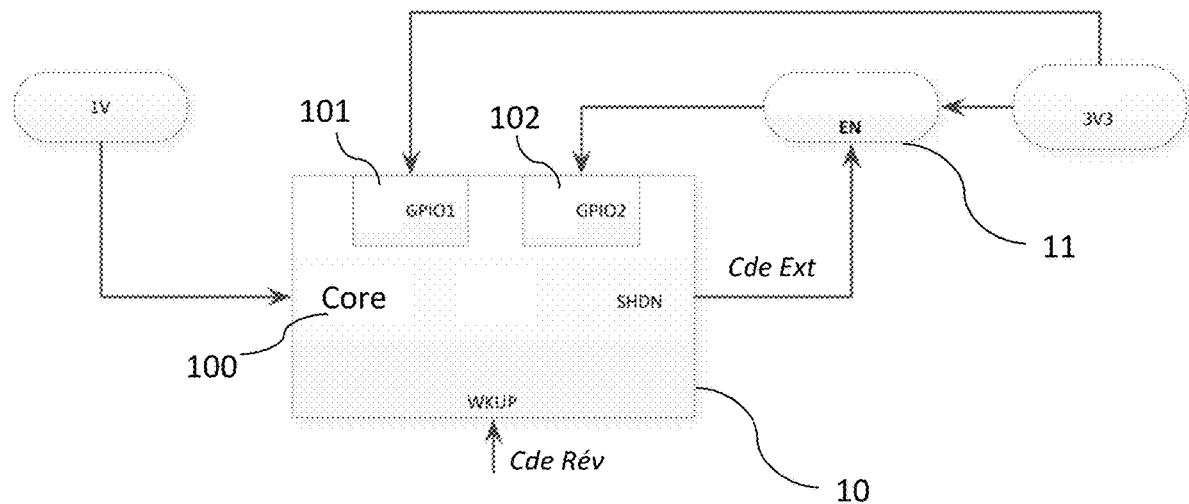
FIG. 1 is a schematic view of a part of a printed circuit according to one embodiment of the invention.

Referring now to FIG. 1, we describe one embodiment of the invention in which the "diverting" of the internal shut-down function of the microcontroller is implemented via a controlled switch, an electronic component known per se.

FIG. 1 represents a part of a printed circuit (for example in an electronic payment terminal or any other electronic apparatus that has to cope with the technical problem posed) illustrating mainly a microcontroller 10 and elements for powering this microcontroller.

Thus, the core 100 of the microcontroller is powered at 1V while the peripheral units are powered at 3.3V (for example through the power supply inputs 101 and 102, corresponding respectively to the power supply of the peripheral unit GPI01 and of the peripheral unit GPI02).

The microcontroller 10 has an input, denoted as WKUP, for its wake-up command Cde Rev, as well as an output, denoted at SHDN, for its internal shut-down function, making it possible, depending on the different embodiments of the invention, to command the controlled switch 11.

In classic operation, the microcontroller 10 is completely shut down upon reception of a command SHDN, i.e. all the power supplies are cut off. Upon reception of a command WKUP, the microcontroller 10 is woken up through the restarting of the cut-off power supplies.

According to the invention, the implementing of the controlled switch 11 makes it possible to select the power supply or supplies of the peripheral units that must be cut off to make the microcontroller pass from the operating mode to the "optimal standby" mode so as to optimize its energy consumption.

According to the example illustrated in FIG. 1, the power supply of the peripheral unit GPI02 is commanded by the switch 11 while those of the peripheral unit GPI01 and of the core of the microcontroller are not commanded by the switch 11. Thus, GPI01 is always powered directly by the 3.3V source and the core of the microcontroller is powered by the source 1V. For example, GPI01 corresponds to the management of the RAM memories.

In this way, the core of the microcontroller 10 and the peripheral unit GPI01, which are deemed to be indispensable for the awakening of the microcontroller as well as the saving of its state when it changes mode, continue to fulfill the "vital" functions of the microcontroller.

Thus, according to this example, when the microcontroller 10 in normal operating mode receives a shut-down command, the output of its internal function SHDN (which is a classic function of the microcontroller 10 not modified by the present invention) sends a command Cde Ext to the controlled switch 11 which receives this command Cde Ext through its reception means. The controlled switch 10 then activates the cutting off of the power supplies of the peripheral units that are connected to it, in this case the power supply input 102 of the peripheral unit GPI02.

Then, when the internal function SHDN is deactivated, the cutting off of the power supply to the peripheral unit GPIO2 is also deactivated in such a way that the peripheral unit GPIO2 is powered again.

Figure 2:
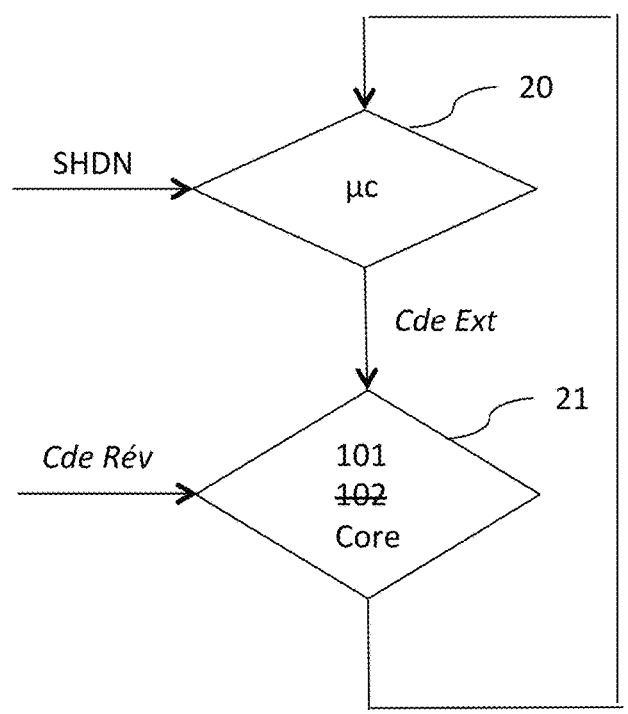
FIG. 2 illustrates a sequence diagram for the implementing of the invention according to one particular embodiment.

As illustrated in FIG. 2, when the microcontroller 10 is in operating mode (20), i.e. in a mode where its core and all the peripherals are powered, and when it receives a shut-down command SHDN, a command Cde Ext is transmitted, by means of its internal shut-down function SHDN, to the controlled switch 11 (which receives this command Cde Ext via its reception means).

The microcontroller 10 then enters an "optimal standby" mode (21) in which the power supply 102 of the peripheral unit GPI02 is cut off while those of the core of the microcontroller and of the peripheral unit GPI01 are maintained.

Then, the exit of the microcontroller 10 from its "optimal standby" mode (21) is implemented as a classic wake-up operation upon reception of a wake-up command Cde Rev at the input WKUP of the microcontroller 10. This wake-up command enables the deactivation of the shut-down output SHDN, hence the repowering of the peripheral cells, the power supply of which had been previously cut off via the controlled switch 11 so that the microcontroller 10 returns into a classic operating mode (20) and is again in the state in which it had been before the request for being placed in "optimal standby" mode.

The invention claimed is:

1. A printed circuit comprising:
   a microcontroller comprising at least one main element, termed as a core, at least one peripheral unit, a command output and an internal shut-down function which when executed by the microcontroller configures the microcontroller to send a shut-down command to the command output to shut down the microcontroller;
   a first power supply input to supply power to the core; and
   a second power supply input to supply power to the at least one peripheral unit; and
   selective means connected to the command output for managing power supplied to said microcontroller by:
      receiving the shut-down command for shutting down said microcontroller; and
      reversibly cutting off of power supplied from the second power supply input to said at least one peripheral unit in response to the shut-down command while maintaining power supplied to said core, the printed circuit thereby being arranged to divert the shut-down command from cutting off of power supplied from the first power supply input to the core.

2. The printed circuit according to claim 1, wherein said selective means for managing the power supply comprise:
   a controlled switch electronically connected between the at least one peripheral unit and the second power supply input and having an input connected to the command output of the microcontroller to receive the shut-down command sent by the microcontroller.

3. The printed circuit according to claim 1, wherein said at least one peripheral unit corresponds to a unit of said microcontroller that is not necessary for waking up the microcontroller and/or not necessary for saving a state of said microcontroller.

4. An electronic payment terminal comprising the printed circuit according to claim 1.

5. A printed circuit comprising:
   a microcontroller comprising a maim core element, at least one peripheral, a command output and an internal shut-down function which when executed by the microcontroller configures the microcontroller to send a shut-down command to the command output to shut down the microcontroller;
   a first power supply input to supply power to the core; and
   a second power supply input to supply power to the at least one peripheral unit; and
   a switch, which is connected to the command output and configured to reversibly cut off of power supplied from the second power supply input to said at least one peripheral unit in response to the shut-down command while maintaining power supplied to said core, the printed circuit thereby being arranged to divert the shut-down command from cutting off of power supplied from the first power supply input to the core.

* * * * *